J. K. STEWART.
COUNTER TRAIN.
APPLICATION FILED DEC. 23, 1914.
1,158,579.
Patented Nov. 2, 1915.
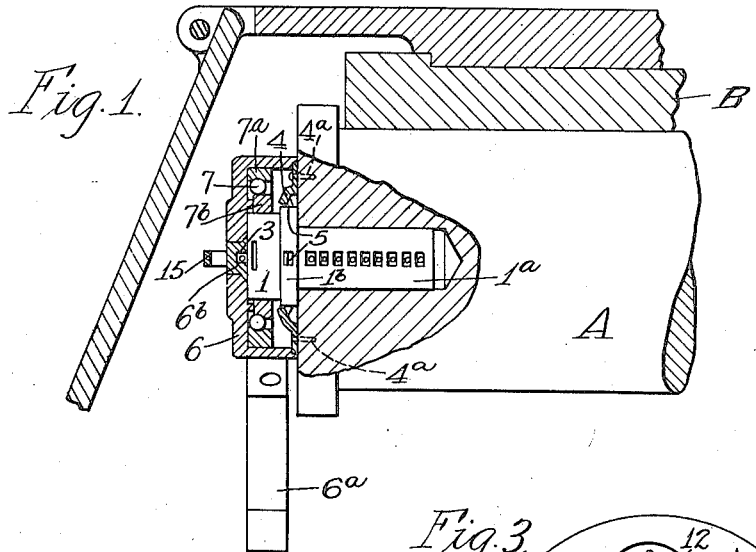
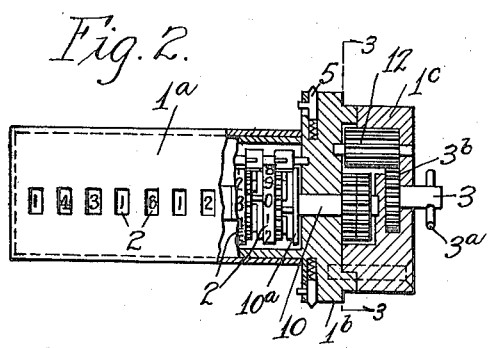
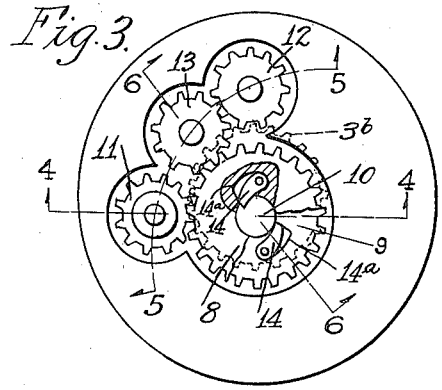
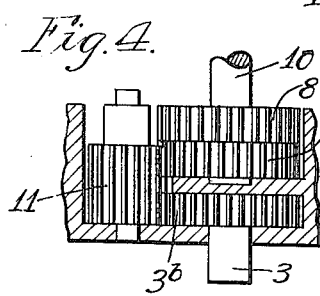
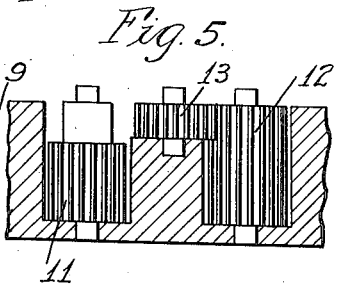
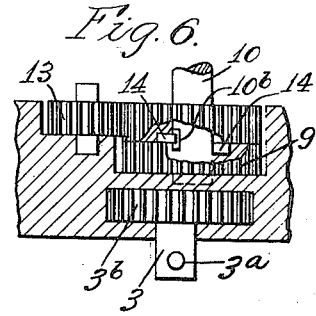
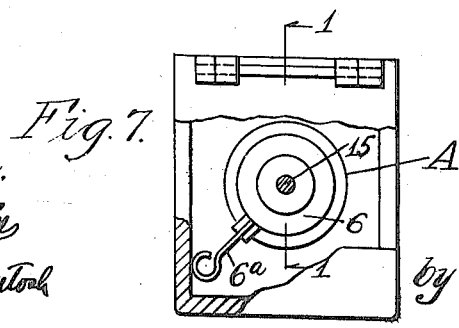
Witnesses:
Inventor:
John K. Stewart.
by Burton & Burton
his Attys.

UNITED STATES PATENT OFFICE.

JOHN K. STEWART, OF CHICAGO, ILLINOIS, ASSIGNOR TO STEWART-WARNER SPEEDOMETER CORPORATION, OF CHICAGO, ILLINOIS, A CORPORATION OF VIRGINIA.

COUNTER-TRAIN.

1,158,579.  Specification of Letters Patent.  Patented Nov. 2, 1915.

Application filed December 23, 1914.   Serial No. 878,678.

*To all whom it may concern:*

Be it known that I, JOHN K. STEWART, a citizen of the United States, residing at Chicago, in the county of Cook and State of Illinois, have invented new and useful Improvements in Counter-Trains, of which the following is a specification, reference being had to the accompanying drawings, forming a part thereof.

The purpose of this invention is to provide an improved construction of gearing train for counting or numbering mechanism.

It consists in the elements and features of construction shown and described as indicated in the claims.

In the drawings:—Figure 1 is a partly sectional side elevation of an axle and journal box equipped with a device embodying this invention. Fig. 2 is a partly sectional side elevation of the counter train device. Fig. 3 is an enlarged detail section at the line 3—3 on Fig. 2. Fig. 4 is a detail section taken as indicated at the line 4—4 on Fig. 3. Fig. 5 is a detail sectional view taken as indicated at the line 5—5 on Fig. 3. Fig. 6 is a detail section taken as indicated at the line 6—6 on Fig. 3. Fig. 7 is an end elevation of the structure shown in Fig. 1, with the car axle box cover broken away.

The mechanism shown in the drawings is, in the special design shown, adapted for use on a car axle to count the revolutions thereof. The counter train with its accompanying gearing is carried in a frame or casing, 1, the dial wheels, 2, being coaxially alined and inclosed within the smaller cylindrical portion, 1ª, of the frame or casing, 1, which latter is designed to be inserted into a recess or socket bored in the end of the member, A, or otherwise secured to one of the two members which are relatively rotated and whose relative rotations are to be counted or indicated by the device. A conical flanged ring, 4, is fixed permanently to the end of the member with respect to which the casing, 1, is fixed by means of screws, 4ª, passing through the flange of said ring, thus leaving its conical portion spaced away from the end of said member, A; and the flange, 1ᵇ, of the frame, 1, is provided with spring-protruded dogs, 5, which extend sufficiently for frictional contact with the under side of the conical ring, 4. The opening in the ring, 4, is only sufficient to admit the flange, 1ᵇ, of the frame; and to permit the insertion of the latter, the spring dogs, 5, are beveled so as to be forced back in the pockets of the flange, 1ᵇ, when the frame, 1, is pressed firmly in position. Upon the frame arriving at position, the dogs, 5, are again protruded by their springs for frictionally gripping the ring, 4, to resist the rotation of the frame with respect to the member, A; that is, to cause it to rotate bodily or stand at rest with said member.

The counter mechanism is completely inclosed by the casing, 1, with the exception of a short portion of the initial shaft, 3, which projects from the outer or exposed end of the frame, 1, when the latter is inserted in position in the member, A, as shown in Fig. 2. A heavy cap, 6, is rotatably mounted upon the exposed portion, 1ᶜ, of the frame, 1, preferably by means of ball bearings, 7, as indicated, with the outer ball race, 7ª, fixed in the cap, and the inner race, 7ᵇ, made tight on the portion, 1ᶜ, of the frame. This cap, 6, is designed to be held against rotation with respect to the other member of the two whose relative rotations are to be counted (the member, A, being one of said two). In the construction as illustrated, said other member is the car axle box, B, and said cap, 6, is prevented from rotation with respect to said box by a radially extending tail, 6ª, which engages the wall of the box, as seen in Fig. 7. Operative connection between this rotatably mounted cap, 6, and the mechanism of the counter train housed in the frame, 1, is provided in the form of a slot, 6ᵇ, positioned to engage a cross pin, 3ª, in the extending end of the initial shaft, 3. Preferably the portion, 1ᶜ, of the frame is cylindrical, and the shaft, 3, is axially disposed within it, while the cap, 6, is mounted upon this portion of the frame so as to rotate about the axis of the shaft, 3, and the connecting slot, 6ᵇ, is positioned to pass through said axis of rotation, so that the rotation of the frame, 1, with respect to the cap, 6, is communicated to the counter train in the simplest manner possible.

For certain uses to which a counter of this character may be applied, as, for example, that to which it is shown applied in the drawings,—counting or indicating the revolutions of a car axle,—it is important that gearing be provided of such character as to cause the counter train itself to revolve always in the same direction, regardless of the rotation of the member whose revolutions are to be counted. For this purpose, there is provided the gearing shown in detail in Figs. 2 and 6 inclusive. This gearing comprises an initial or driving gear, 3$^b$, fixed to the shaft, 3, and two driven gears, 8 and 9, loosely mounted on the shaft, 10, of the first wheel, 10$^a$, of the counter train proper. The driven gear, 9, is connected with the driving gear, 3$^b$, through a single idler pinion, 11, while the driven gear, 8, is connected to said driving gear, 3$^b$, through a series of idler pinions. As illustrated, this series comprises two pinions, 12 and 13; thus, the two driven gears, 8 and 9, are simultaneously revolved in opposite directions. Each of the gears, 8 and 9, carries a ratchet dog, 14, adapted to engage the notch, 10$^b$, in the shaft, 10, whereby the shaft, 10, is adapted to be driven in one direction only, and only by one of the two gears at a time. Thus, if, when the initial shaft, 3, is rotated in one direction, the shaft, 10, is driven by the gear, 8, the gear, 9, will then revolve idly in the reverse direction; but upon reversal of the direction of rotation of the initial shaft, 3, the direction of the rotation of the gear, 8, will be reversed, rendering this gear inoperative upon the shaft, 10; but the simultaneous reversal of the direction of rotation of the gear, 9, will bring its driving dog, 14, into engagement with the notch, 10$^b$, of the shaft, 10, and said shaft will thus continue to rotate in its original direction driven through the gear, 9. The ratchets, 14, are of flat stock and are merely laid in flat depressions or recesses in the faces of the respective gears, 8 and 9, so as to come flush with the general surface of the gears. A small knee spring, 14$^a$, is inserted in each of the recesses back of the ratchet, and the entire assemblage becomes self-inclosed by the mounting of the gears, 8 and 9, with their ratchet bearing faces proximate to each other, as seen in Fig. 6.

As may be seen from Fig. 4, the idler, 11, while meshing with the gear, 3$^b$, and with the driven gear, 9, stops short of the plane of the gear, 8, and thus avoids interference with the teeth of the latter. The shaft, 10, being eccentrically mounted in the frame, 1, is not alined with the shaft, 3, and a position may thus be chosen for the long idler pinion, 12, at which it will mesh with the driving gear, 3$^a$, but avoid engaging the teeth of both the gears, 8 and 9, even though the latter be of the same size as the gear, 3$^a$. Motion is then communicated from this long pinion, 12, to the gear, 8, through the idler, 13, and the resulting opposite rotation of the two gears, 8 and 9, is obtained, as above described.

I claim:—

1. In combination with a prime shaft, gearing comprising two driven gears, both loosely mounted on the prime shaft, said shaft having a ratchet tooth, said gears being disposed face to face on said shaft and having such proximate faces respectively recessed; a ratchet dog lodged in the recess of each gear and not otherwise secured to said gear, and means for preventing separation of the gears along the shaft, whereby the ratchet disks are housed between the gears, together with a driving gear and connections adapted for rotating the said driven gears in opposite directions simultaneously.

2. In combination with a prime shaft, gearing comprising a driving gear; two driven gears, both loosely mounted on the prime shaft, said shaft having a ratchet tooth; a dog on each of said gears adapted to engage said tooth; a single idler gear connecting the driving gear with the other of said driven gears, and a series of two idler gears connecting the driving gear with the other of said driven gears, whereby the prime shaft is rotated in a constant direction by rotation of the driving gear in either direction.

In testimony whereof, I have hereunto set my hand at Chicago, Illinois, this 11 day of Dec., 1914.

JOHN K. STEWART.

Witnesses:
C. B. SMITH,
H. BLIVEN.